US010374296B2

(12) United States Patent
Glezerman et al.

(10) Patent No.: US 10,374,296 B2
(45) Date of Patent: Aug. 6, 2019

(54) COMMUNICATION SYSTEM AND DEVICE

(71) Applicant: Cardo Systems, Inc., Pittsburgh, PA (US)

(72) Inventors: Abraham Glezerman, Tel Aviv (IL); Abraham Moato, Rlshon Le'Zion (IL); Avraham Kushnirov, Ra'anana (IL); Uri Gilboa, Givatayim (IL)

(73) Assignee: Cardo Systems, Ltd., Ra'anana (IL)

( * ) Notice: Subject to any disclaimer, the term of this patent is extended or adjusted under 35 U.S.C. 154(b) by 246 days.

(21) Appl. No.: 15/322,758

(22) PCT Filed: Jun. 25, 2015

(86) PCT No.: PCT/IL2015/050658
§ 371 (c)(1),
(2) Date: Dec. 29, 2016

(87) PCT Pub. No.: WO2016/001915
PCT Pub. Date: Jan. 7, 2016

(65) Prior Publication Data
US 2017/0141460 A1 May 18, 2017

(30) Foreign Application Priority Data

Jun. 30, 2014 (IL) .......................................... 233455

(51) Int. Cl.
*H01Q 1/27* (2006.01)
*A42B 3/30* (2006.01)
(Continued)

(52) U.S. Cl.
CPC ............... *H01Q 1/276* (2013.01); *A42B 3/30* (2013.01); *A42B 3/303* (2013.01); *H01Q 1/2291* (2013.01);
(Continued)

(58) Field of Classification Search
CPC ...... H01Q 1/276; H01Q 1/2291; H04B 1/385; H04B 2001/3866
(Continued)

(56) References Cited

U.S. PATENT DOCUMENTS

2006/0057972 A1* 3/2006 Wikel ...................... A42B 3/30
455/90.3
2010/0069002 A1 3/2010 Rong
(Continued)

FOREIGN PATENT DOCUMENTS

| EP | 2302815 | 3/2011 |
| JP | 2007254926 | 10/2007 |
| WO | 2014/107585 | 7/2014 |

OTHER PUBLICATIONS

Supplementary European Search Report of EP 15814352 dated Jan. 16, 2018, 10 pages.
(Continued)

*Primary Examiner* — Ayodeji O Ayotunde
(74) *Attorney, Agent, or Firm* — Rankin, Hill & Clark LLP

(57) ABSTRACT

The present invention relates to a communication system for a helmet, comprising a docking station located in the rear portion of said helmet, and a detachable portion adapted to be connected to said helmet via said docking station, wherein said detachable portion comprises pressure-activated elements, which are located at a distance from the center of the rear portion of said helmet, such as to be easily reached by the fingers of the wearer.

5 Claims, 5 Drawing Sheets

(51) Int. Cl.
*H01Q 1/22* (2006.01)
*H04B 1/3827* (2015.01)

(52) U.S. Cl.
CPC ..... *H04B 1/385* (2013.01); *H04B 2001/3866* (2013.01)

(58) Field of Classification Search
USPC ........................................................ 455/90.3
See application file for complete search history.

(56) References Cited

U.S. PATENT DOCUMENTS

| | | |
|---|---|---|
| 2012/0189153 A1 | 7/2012 | Kushnirov et al. |
| 2013/0086722 A1* | 4/2013 | Teetzel ..................... F41H 1/04 2/2.5 |
| 2013/0241799 A1 | 9/2013 | Twina |
| 2014/0189937 A1* | 7/2014 | Pietrzak ................ A42B 3/042 2/411 |

OTHER PUBLICATIONS

International Search Report of PCT/IL2015/050658 dated Oct. 15, 2015, 2 pages.
Written Opinion of the International Searching Authority of PCT/IL2015/050658 dated Oct. 15, 2015, 4 pages.

\* cited by examiner

COMMUNICATION SYSTEM AND DEVICE

FIELD OF THE INVENTION

The present invention relates to communication systems. More particularly, the invention relates to communication systems suitable for use in conjunction with a helmet such as, but not limited to, those worn by drivers and passengers of motorcycles.

BACKGROUND OF THE INVENTION

Helmets provided with communication means are known in the art. The exact communication system may vary from one helmet to another, and may include Bluetooth systems, whether autonomous or operating through a portable communication device, such as a smart phone, or systems employing different wireless communication systems and protocols.

The location of the communication system in the helmet is of paramount importance for ease and safety of operation, for maintenance and for convenience and comfort of the wearer. So far, the art has failed to provide a communication system located in the rear portion of a helmet, which provides a safe and convenient operation. It is an object of the present invention to provide a communication system that is mounted on the rear portion of a helmet, and yet can be easily and conveniently operated by the wearer.

It is another object of the invention to provide a communication system comprising a docking station adapted to receive a unit comprising elements operatable by touch, which can be used by the wearer to operate the communication system.

It is yet another object of the invention to provide a communication system that is docked to the rear the helmet while still maintaining ease of operation by the wearer, without the need to reach the back of the helmet with the hand.

Other objects and advantages of the invention will become apparent from the description to follow.

SUMMARY THE INVENTION

In one aspect the invention relates to a communication system for a helmet, comprising a docking station located in the rear portion of said helmet, and a detachable portion adapted to be connected to said helmet via said docking station, wherein said detachable portion comprises pressure-activated elements, which are located at a distance from the center of the rear portion of said helmet, such as to be easily reached by the fingers of the wearer.

In one embodiment of the communication system of the invention the docking station is located on the trim of the helmet.

In another preferred embodiment of the invention the distance from the center of the docking station to the closest edge of the pressure-activated elements closer to it, which is not an on/off switch, is at least 4.5 centimeters. In another embodiment of the invention the distance from the center of the docking station to the pressure-activated elements closer to it, which is not an on/off switch, is approximately 6.5 centimeters.

It is possible to provide an on/off switch that is located separately from the pressure-activated elements, although this may be less elegant than the case in which all operating switches, buttons and pressure elements are located close to one another. In an embodiment of the invention the pressure-activated elements include discrete keys, but pressure strip elements, or other continuous switching elements, can also be provided.

In order to communicate between the system of the invention and autonomous communication means of the user, as may be a Bluetooth-enabled phone, and antenna is needed. In one embodiment of the invention the Bluetooth antenna is located near the end of the detachable portion that is the farthest from the back center of the helmet and can be conveniently housed in the housing of the detachable portion.

The invention also encompasses a detachable communication device, suitable to operate together with communication elements provided in a helmet, comprising pressure-activated elements, which, when the device is connected to a helmet, are located at a distance from the center of the rear portion of said helmet, such as to be easily reached by the fingers of the wearer.

DETAILED DESCRIPTION OF THE INVENTION

Figure 1:
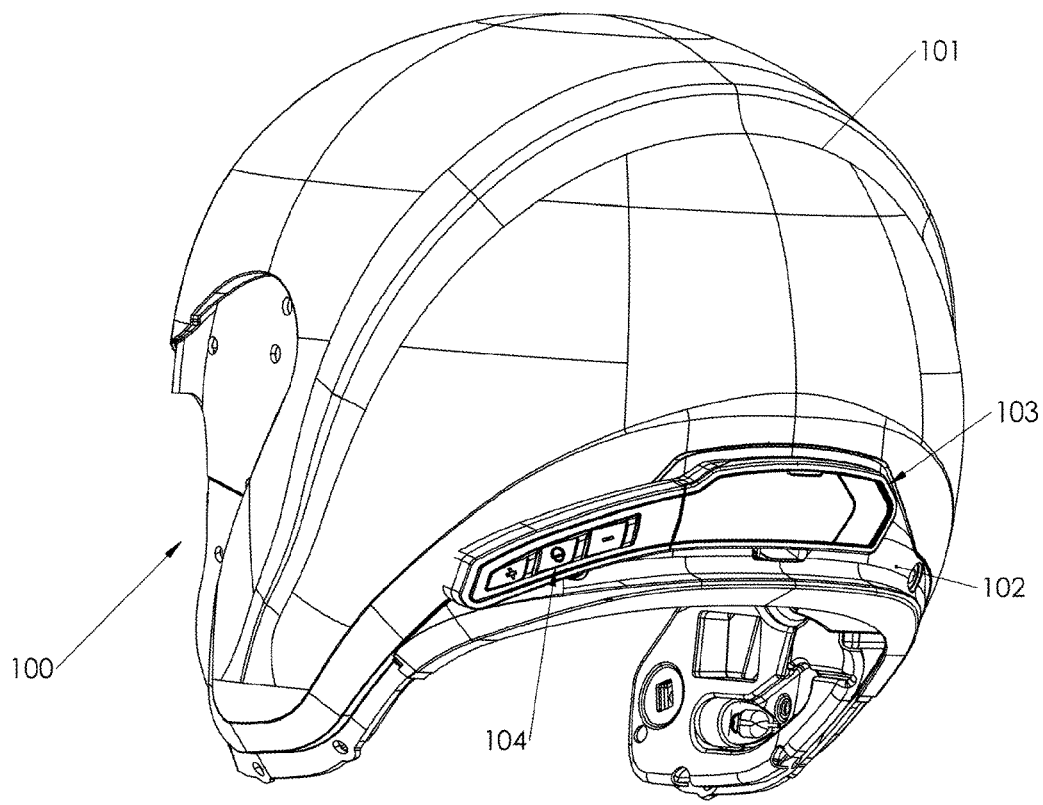
FIG. 1 is a rear view of a helmet according to one embodiment of the invention, with the inner padding removed, including the detachable portion of the communication system.

Looking now at FIG. 1, a helmet is generally indicated by numeral 100. Helmet 100 comprises a main body 101, which is typically made with a monolithic outer shell, and a lower portion 102, which is known in the art as "trim". This lower portion is often made of softer material than the outer shell of the helmet and has the purpose of allowing better comfort for the wearer than can be afforded by the harder material of the outer shell, and also provides more aesthetic finishing to the edge of the helmet.

According to an embodiment of the invention, the docking station for the removable part of the communication system is provided in the trim, however the invention is also meant to include communication systems in which the docking station is provided in the outer shell of the helmet, although this option may be less convenient in the manufacturing process of the final helmet. It should be noted that a regular helmet trim usually reaches lower than the one showed in the figure, which has been made higher than it would otherwise have been, for the purpose of housing the docking station of the detachable communication apparatus that will be described in greater detail below. Accordingly, the invention is illustrated in the appended drawings using helmets with a trim that houses the docking station, without intending to limit the invention thereby.

In FIG. 1 the helmet is shown in operational form, with the removable portion 103 attached to the docking station, and said docking station is therefore hid by it and is not seen in the figure. As will be apparent to the skilled person, and as further discussed hereinafter, the removable portion 103, which is the, removable portion 103 (also referred to herein as the "detachable part of the communication system") includes touch-operated elements, generally indicated in the figure by numeral 104, which extend from the rear of the helmet toward a side area thereof, thus affording easy access to the wearer's fingers.

The touch-operated elements 104 must be correctly positioned to provide the advantages of the invention, and that is why they are not positioned at the middle of the back portion of the helmet (roughly corresponding to the middle of the wearer's neck). In one embodiment of the invention the closest edge of the of the pressure element which is the closest to the center of the helmet's back (which center is generally indicated by arrow 300 in FIG. 4(a)) is spaced at least 4.5 cm therefrom. In another embodiment of the invention, which affords even greater comfort to the wearer, said distance is approximately 6.5 cm. However, the aforesaid is of particular importance for the buttons/pressure elements that the wearer of the helmet must operate while riding. It is possible to position an on/off switch anywhere on the helmet, since it only has to be operated once before the ride begins and, therefore, its position is not critical. However, in the embodiments illustrated herein the on/off switch is positioned together with the other pressure-activated elements, which is a more elegant construction, but this is not intended to limit the invention in any way.

The touch-operated elements 104 must not necessarily include elevated portions and can be provided as a continuous strip, although it is desirable to provide elements that can be differentiated by the user at the touch. In such a case, however, the distance from the center of the docking station will be measured to the edge of the active area of the first touch-operated element, even if such element is not visually discernible and even if it is located inside the casing of removable portion 103.

Figure 2:
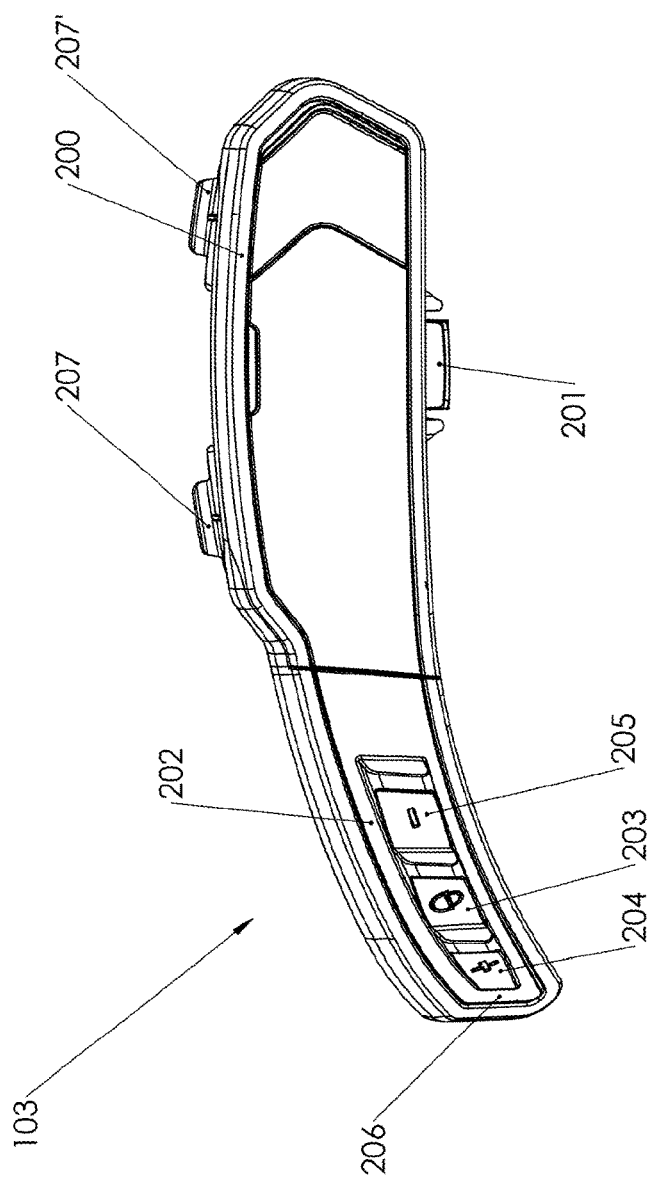
FIG. 2 is a detailed view of a detachable portion of a communication system according to one embodiment of the invention.

FIG. 2 shows the detachable part of the communication system (103 in FIG. 1), which consists of a main body portion 200, provided (in this exemplary embodiment of the invention) with a snap-on element indicated by numeral 201, and with two hooks 207 and 207', which together enable the fast connection and detachment of removable portion 103 from its docking station in the helmet. Of course, the actual fastening means can be of any other type and the snap-on-hooks combination is just one possible alternative fastening method. The pressure-operated portion 202 of the detachable part of the communication system, also referred to as "keyboard", comprises "keys", which are pressure activated elements, and three of them are shown in this illustrative embodiment of the invention, and are indicated by numerals 203, 204 and 205, respectively. Each key may be assigned a different role, such as "on" and "off", "speak", etc. Again, the on/off switch 203 can instead be located anywhere else. The housing of portion 202 can be made of rigid or flexible material, for instance depending on the actual connection method between the detachable part of the communication system and its docking station.

In one embodiment of the invention the Bluetooth antenna needed for communication to take place is located inside the housing. In another embodiment of the invention the antenna is located as near the tip 206 of the housing of portion 202 as possible. Positioning the antenna at the tip offers better communication between the communication system and the rider's phone, since positioning the antenna at the back of the helmet has been found to induce communication problems due to a masking effect of the helmet.

Figure 3:
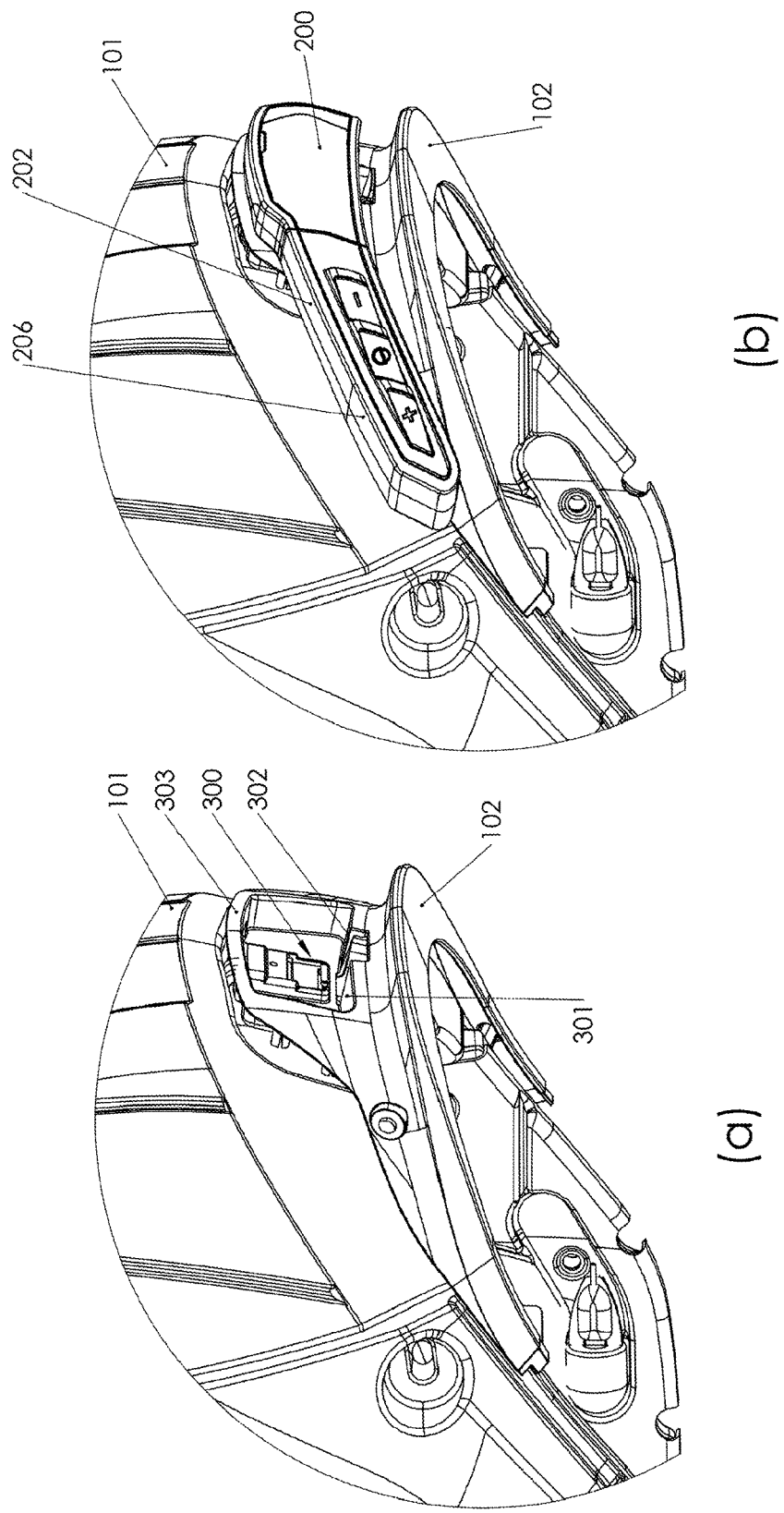
FIGS. 3 (a and b) are perspective side views of a helmet according to one embodiment of the invention, with the removable portion of the communication system removed and attached, respectively.

FIG. 3 shows the trim 102 that includes a docking station 300, and schematically illustrates its positioned relationship relative to the EPS body 101 of the helmet. In FIG. 3 (a) the detachable portion of the communication system has been removed and the docking station 300 is exposed, and is provided with a cavity 301 and a recess 302 for snap-on element 201 of FIG. 2. Recesses adapted to house hooks 207 and 207' of FIG. 2 are provided in upper portion 303 of cavity 300, and are not seen in this figure.

FIG. 3 (b) shows the same view as in FIG. 3 (a), with the difference that the detachable portion 200 has been attached to the docking station.

Figure 4:
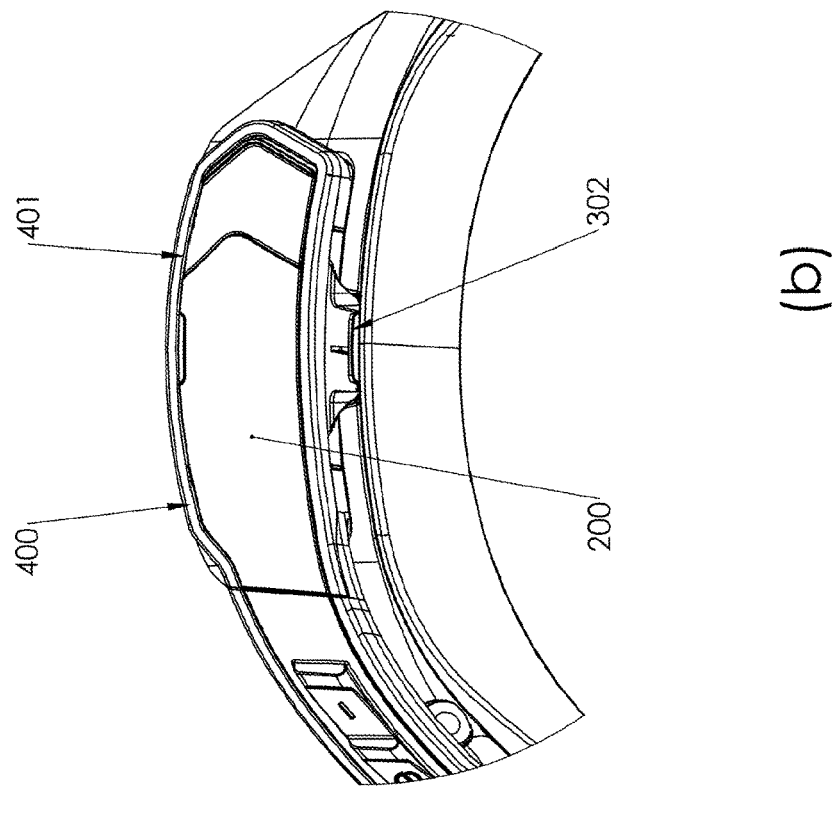
FIG. 4 illustrates the attachment of the removable portion of the communication system to its docking station, according to one embodiment of the invention.
Figure 4:
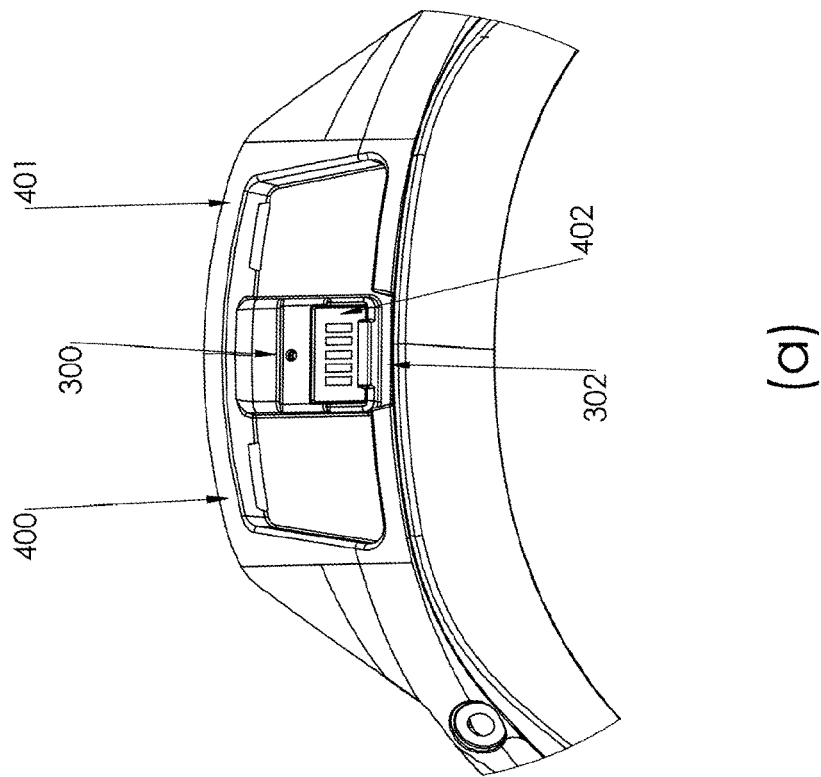

FIG. 4 illustrates the attachment of the detachable portion of the communication system to its docking station located in the trim, according to one embodiment of the invention. FIG. 4 (a) shows the docking station 300, and three connecting elements, two of which are, in this particular embodiment, recesses 400 and 401 for hooks 207 and 207', and recess 302 for snap-on element 201 (FIG. 2). A electric connector 402 is provided to connect the detachable communication element to the portion of the system that is provided in the helmet.

In FIG. 4 (b) detachable portion 200 is in its docking, and is kept firmly in place by snap 302, and hooks 400 and 401, which are hidden by the body of portion 200 and are not seen in the figure, but their position is indicated by the arrows.

Figure 5:
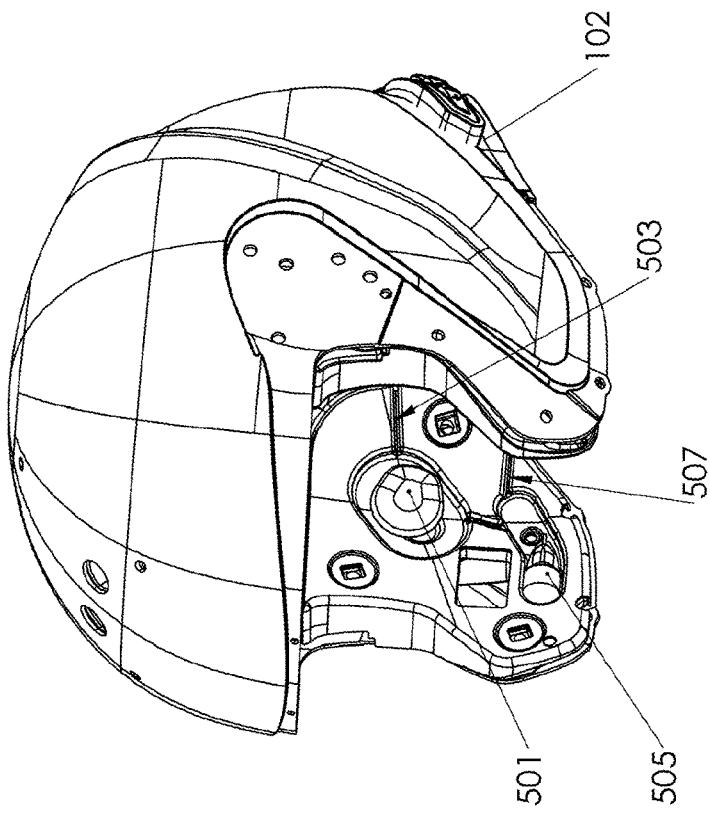
FIGS. 5 (a and b) is a view of a helmet according to one embodiment of the invention, illustrating other elements of the communication system and their positioned relationships.
Figure 5:
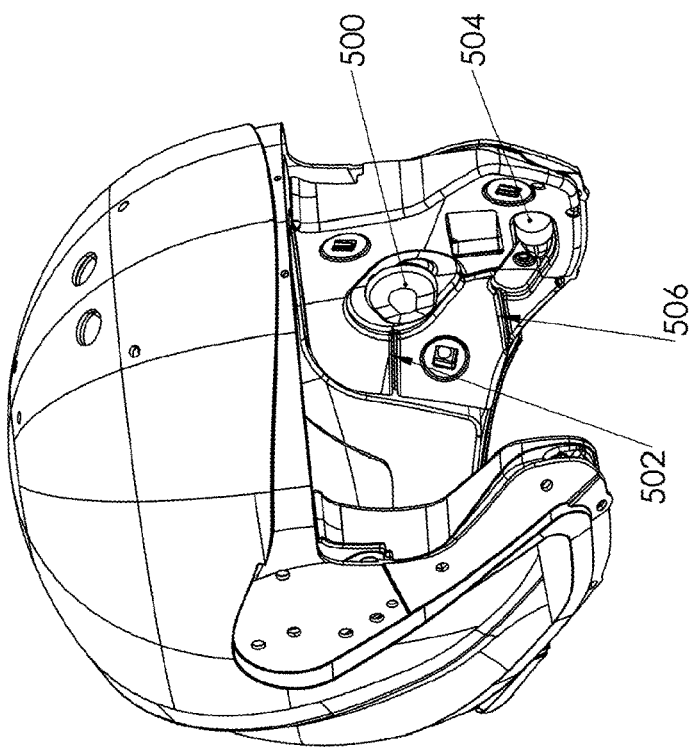

FIGS. 5 (a) and (b) shows the location of various elements of the whole communication system of the helmet. The system further comprises left and right speakers 500 and 501, respectively, which are connected to the docking station via left and right speaker cables, 502 and 503, respectively. This particular illustrative embodiment of the invention employs two microphones, 504 and 505, which are connected to the docking station via cables 506 and 507, respectively. The electric arrangements and connections between these elements in the docking station, as well as the connection between the detachable element of the communication system and the docking station, can be effected in a variety of ways, which would be readily apparent to the skilled person and, therefore, are not illustrated herein in detail, for the sake of brevity.

All the above description of illustrative embodiments of the invention have been provided for the purpose of illustration only and are not meant to limit the invention in any way. As will be apparent to the skilled person, many different shapes of the detachable portion of the communication system can be devised, as is the case for the docking station, the trim, and the positioning of the various elements within the helmet. Many variations of the illustrative embodiments can be provided without exceeding the scope of the invention as defined in the claims.

The invention claimed is:

1. A communication system for a helmet, comprising a docking station located at a rear portion of the helmet and affixed to the helmet, and a detachable portion adapted to be connected to the helmet via the docking station, wherein the detachable portion comprises pressure-activated elements, which, when the detachable portion is connected to the helmet, are located at a distance of at least 4.5 centimeters, measured from a center of the rear portion of the helmet to an edge of the pressure-activated elements closest to the center of the rear portion of the helmet, which is not an on/off switch, allowing the pressure-activated elements to be easily reached by fingers of a wearer of the helmet, wherein the detachable portion comprises an antenna, which is located near an end of the detachable portion that, when the detachable portion is connected to the helmet, is the farthest from the center of the rear portion of the helmet on a side of the center of the rear portion of the helmet where the pressure-activated elements are located, wherein the antenna is housed in a housing of the detachable portion.

2. A communication system according to claim 1, wherein the docking station is located on a trim of the helmet.

3. A communication system according to claim 1, wherein the distance from the center of the rear portion of the helmet to the edge of the pressure-activated elements closest to the center of the rear portion of the helmet, which is not an on/off switch, is approximately 6.5 centimeters.

4. A communication system according to claim 1, wherein an on/off switch is provided separately from the pressure-activated elements.

5. A communication system according to claim 1, wherein the pressure-activated elements include discrete keys.

\* \* \* \* \*